(12) United States Patent  
Kawai

(10) Patent No.: US 7,817,908 B2
(45) Date of Patent: Oct. 19, 2010

(54) IMAGE STABILIZER

(75) Inventor: Sumio Kawai, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 207 days.

(21) Appl. No.: 12/136,283

(22) Filed: Jun. 10, 2008

(65) Prior Publication Data

US 2009/0003812 A1 Jan. 1, 2009

(30) Foreign Application Priority Data

Jun. 28, 2007 (JP) ............... 2007-171059

(51) Int. Cl.
*G03B 17/00* (2006.01)
(52) U.S. Cl. .................. 396/55; 348/208.11
(58) Field of Classification Search ............ 396/55; 348/208.11
See application file for complete search history.

(56) References Cited

U.S. PATENT DOCUMENTS

| 2003/0067544 | A1* | 4/2003 | Wada ............ 348/208.7 |
| 2004/0263846 | A1* | 12/2004 | Kwan ............ 356/399 |
| 2006/0056830 | A1* | 3/2006 | Tanaka et al. ....... 396/55 |
| 2006/0092285 | A1* | 5/2006 | Shin ............ 348/208.7 |
| 2007/0200564 | A1* | 8/2007 | Motz et al. .......... 324/247 |
| 2007/0257989 | A1* | 11/2007 | Shirono ......... 348/208.99 |
| 2008/0145042 | A1* | 6/2008 | Kawai et al. ......... 396/55 |
| 2009/0146647 | A1* | 6/2009 | Ausserlechner ..... 324/207.21 |

FOREIGN PATENT DOCUMENTS

JP 2006-081348 3/2006

* cited by examiner

*Primary Examiner*—Christopher E Mahoney
*Assistant Examiner*—Fang-Chi Chang
(74) *Attorney, Agent, or Firm*—Volpe and Koenig, P.C.

(57) ABSTRACT

An image stabilizer includes a fixed member, a first movable member, a second movable member, and a position sensor. The fixed member includes a first actuator arranged near a first side of an imaging device in parallel with the first side. The first movable member includes a second actuator arranged near a second side perpendicular to the first side in parallel with the second side and moves, when driven by the first actuator, in the direction of the first side. The second movable member has the imaging device mounted thereon and moves, when driven by the second actuator, in the direction of the second side. The position sensor detects the relative position of the imaging device moved by the first and second actuators. The first and second actuators are located near an intersection of the longitudinal axes of them not to interfere with each other.

8 Claims, 9 Drawing Sheets

ELLIPTICAL VIBRATION

NODAL PLANE OF VIBRATION

NODAL LINE OF VIBRATION

IMAGE STABILIZER

CROSS-REFERENCE TO RELATED APPLICATIONS

This application is based upon and claims the benefit of priority from Japanese Patent Application No. 2007-171059, filed Jun. 28, 2007, the entire contents of which are incorporated herein by reference.

BACKGROUND OF THE INVENTION

1. Field of the Invention

The present invention relates to an image stabilizer that corrects for shake on a hand-held shot with an imaging apparatus.

2. Description of the Related Art

Conventional imaging apparatuses such as digital cameras are often provided with an image stabilizer to stabilize hand-shake blurring. Japanese Patent Application Laid-open No. 2006-81348 discloses an example of an image stabilizer. The image stabilizer shifts, by an actuator, an imaging device such as a charge-coupled device (CCD) in a plane perpendicular to the imaging optical axis in the horizontal and vertical directions independently of each other. Thus, the image stabilizer corrects the position on the imaging surface of the imaging device where light rays reflected from an object are focused. With this configuration, there is a need for a position sensor to detect the relative position of the imaging device shifted by the actuator. In the imaging apparatus, a position sensor is arranged on the outside of the actuator for moving the imaging device.

SUMMARY OF THE INVENTION

An image stabilizer according to one aspect of the present invention is for correcting a position on a surface of a rectangular imaging device where light rays reflected from an object are focused. The image stabilizer includes a fixed member that includes a first actuator including a piezoelectric element having as a whole an elongated shape, the fixed member being arranged near a first side of the imaging device in parallel with a direction of the first side; a first movable member that includes a second actuator including a piezoelectric element having as a whole an elongated shape, the first movable member being arranged near a second side of the imaging device perpendicular to the first side in parallel with a direction of the second side, the first movable member moving, when driven by the first actuator, in the direction of the first side on the fixed member; a second movable member that is mounted with the imaging device and moves, when driven by the second actuator, in the direction of the second side on the first movable member; and a position sensor that detects the relative position of the imaging device moved by either or both the first actuator and the second actuator. The first actuator is located near a virtual intersection of the longitudinal axis of the first actuator and the longitudinal axis of the second actuator not to interfere with the second actuator. The second actuator is located near the virtual intersection not to interfere with the first actuator. The position sensor is located in a region that is partly surrounded by an edge of the first actuator and the second actuator and that includes the virtual intersection.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The following embodiments describe an image stabilizer that corrects hand-shake in an imaging unit including an imaging device that obtains an image signal by photoelectric conversion, and that is applied to, for example, a single-lens reflex electronic camera with interchangeable lenses.

Figure 1:
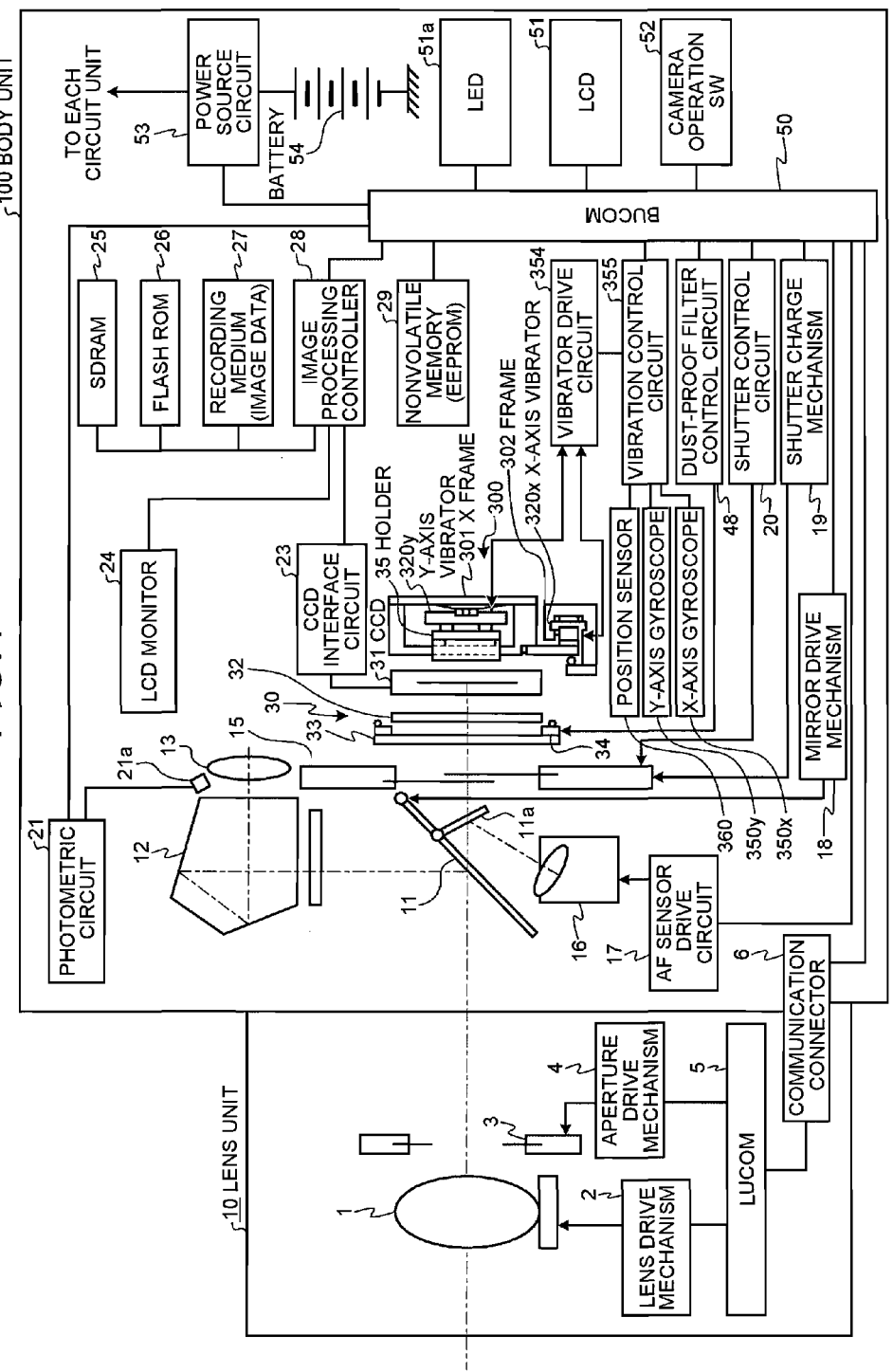
FIG. 1 is a block diagram of an electronic camera with an image stabilizer according to an embodiment of the present invention.

A system configuration of an electronic camera with an image stabilizer according to an embodiment of the present invention is described below with reference to FIG. 1. FIG. 1 is a schematic block diagram mainly showing an electrical system configuration of the electronic camera. The system configuration of the electronic camera includes a body unit 100 as the main body, and a lens unit 10 used as an interchangeable lens, which is one of accessories of the camera.

The lens unit 10 is detachably attached to the body unit 100 through a lens mount (not shown) on the front of the body unit 100. The lens unit 10 includes a microcomputer (hereinafter, "Lucom") 5 that controls the lens unit 10. On the other hand, the body unit 100 includes a microcomputer (hereinafter, "Bucom") 50 that controls the body unit 100. While the lens unit 10 is attached to the body unit 100, the Lucom 5 and the Bucom 50 are electrically connected to each other via a communication connector 6 so that they can communicate with each other. The camera system is configured such that the Lucom 5 operates dependently and in cooperation with the Bucom 50.

The lens unit 10 further includes an imaging lens 1, a lens drive mechanism 2, an aperture 3, and an aperture drive mechanism 4. The imaging lens 1 is driven by a direct-current (DC) motor (not shown) provided in the lens drive mechanism 2. The aperture 3 is driven by a stepper motor (not shown) provided in the aperture drive mechanism 4. The Lucom 5 controls the motors according to an instruction from the Bucom 50.

As shown in FIG. 1, the body unit 100 is provided therein with single-lens reflex components, a focal plane shutter 15 arranged on the imaging optical axis, and an auto-focus (AF) sensor unit 16. The single-lens reflex components constitute an imaging optical system, and include a quick-return mirror 11, a pentaprism 12, an eyepiece 13, and a submirror 11a. The AF sensor unit 16 receives light rays reflected from the submirror 11a, and detects a defocus amount.

The body unit 100 is further provided therein with an AF sensor drive circuit 17, a mirror drive mechanism 18, a shutter charge mechanism 19, a shutter control circuit 20, and a photometric circuit 21. The AF sensor drive circuit 17 controls the drive of the AF sensor unit 16. The mirror drive mechanism 18 controls the drive of the quick-return mirror 11. The shutter charge mechanism 19 charges a spring for driving the front and rear curtains of the shutter 15. The shutter control circuit 20 controls the motion of the front and rear curtains. The photometric circuit 21 performs photometric measurements based on output rays from the pentaprism 12 detected by a photometric sensor 21a.

On the imaging optical axis is arranged an imaging unit 30 that converts light reflected from an object and having passed through the imaging optical system into an electrical signal. The imaging unit 30 includes a charge-coupled device (CCD) 31 as an imaging device, an optical low-pass filter (LPF) 32, and a dust-proof filter 33. On the circumference of the dust-proof filter 33 is provided a piezoelectric element 34. The piezoelectric element 34 has two electrodes. A dust-proof filter control circuit 48 causes the piezoelectric element 34 to vibrate at a predetermined frequency to vibrate the dust-proof filter 33, thereby removing dust from the filter surface. The imaging unit 30 further includes an image stabilizer 300 that corrects for camera shake, described later.

The camera system further includes a CCD interface circuit 23 connected to the CCD 31 and an image processing controller 28. The image processing controller 28 performs image processing using a liquid crystal display (LCD) monitor 24, and as storage areas, synchronous dynamic random access memory (SDRAM) 25 and a flash read only memory (ROM) 26, and the like. Thus, the camera system is configured to be capable of providing electronic storage/display function as well as electronic imaging function. A recording medium 27 is configured to be communicably connected to the electronic camera via a communication connector and disconnectable therefrom. The recording medium 27 is an external storage medium, examples of which include various types of memory cards and an external hard disk drive (HDD) Image data captured by the electronic camera is stored in the recording medium 27. As another storage area, a nonvolatile memory 29 is provided that is formed of an electrically erasable programmable read only memory (EEPROM) The nonvolatile memory 29 stores therein predetermined control parameters necessary for camera control, and is accessible from the Bucom 50.

The Bucom 50 is provided with an LCD 51, a light emitting diode (LED) 51a, and a camera operation switch (SW) 52. The LCD 51 and the LED 51a notify a user of the operation state of the electronic camera by the display or output thereof. The camera operation SW 52 is a group of switches including operation buttons necessary for operating the electronic camera. Examples of such operation buttons include a release button, a mode switching button and a power button. The Bucom 50 is further provided with a battery 54 as a power source, a power source circuit 53, and a voltage detector circuit (not shown). The power source circuit 53 converts the voltage of the battery 54 to voltages required to the respective circuit units that constitute the camera system to supply power thereto. The voltage detector circuit detects a voltage change due to a current supplied from an external power source via a plug.

The following is a schematic description of the operation of each component of the camera system configured as above. The image processing controller 28 controls the CCD interface circuit 23 to acquire image data from the CCD 31 according to an instruction from the Bucom 50. The image data is converted by the image processing controller 28 into a video signal, and is displayed on the LCD monitor 24. From the display on the LCD monitor 24, the user can check an image captured by the electronic camera.

The configuration of the imaging unit 30 is described in further detail below with reference to FIG. 6. As described above, the imaging unit 30 includes the CCD 31 as an imaging device, the optical LPF 32, the dust-proof filter 33, and the piezoelectric element 34. The dust-proof filter 33 is arranged on the front side of the optical LPF 32 such that they face each other with a predetermined spacing between them. The imaging surface of the CCD 31 is exposed to light that has passed through the imaging optical system. Thus, the CCD 31 obtains an image signal corresponding to the light. The CCD 31 is rectangle, and on the imaging surface side thereof is arranged the optical LPF 32. The optical LPF 32 removes high-frequency components from light reflected from an object and having passed through the imaging optical system. The piezoelectric element 34 is arranged on the circumference of the dust-proof filter 33, and vibrates the dust-proof filter 33 at a predetermined amplitude. By way of example, and not as a limitation, CCD is cited above as the imaging device; however, the imaging device can be a complementary metal oxide semiconductor (CMOS) sensor or the like.

Figure 4:
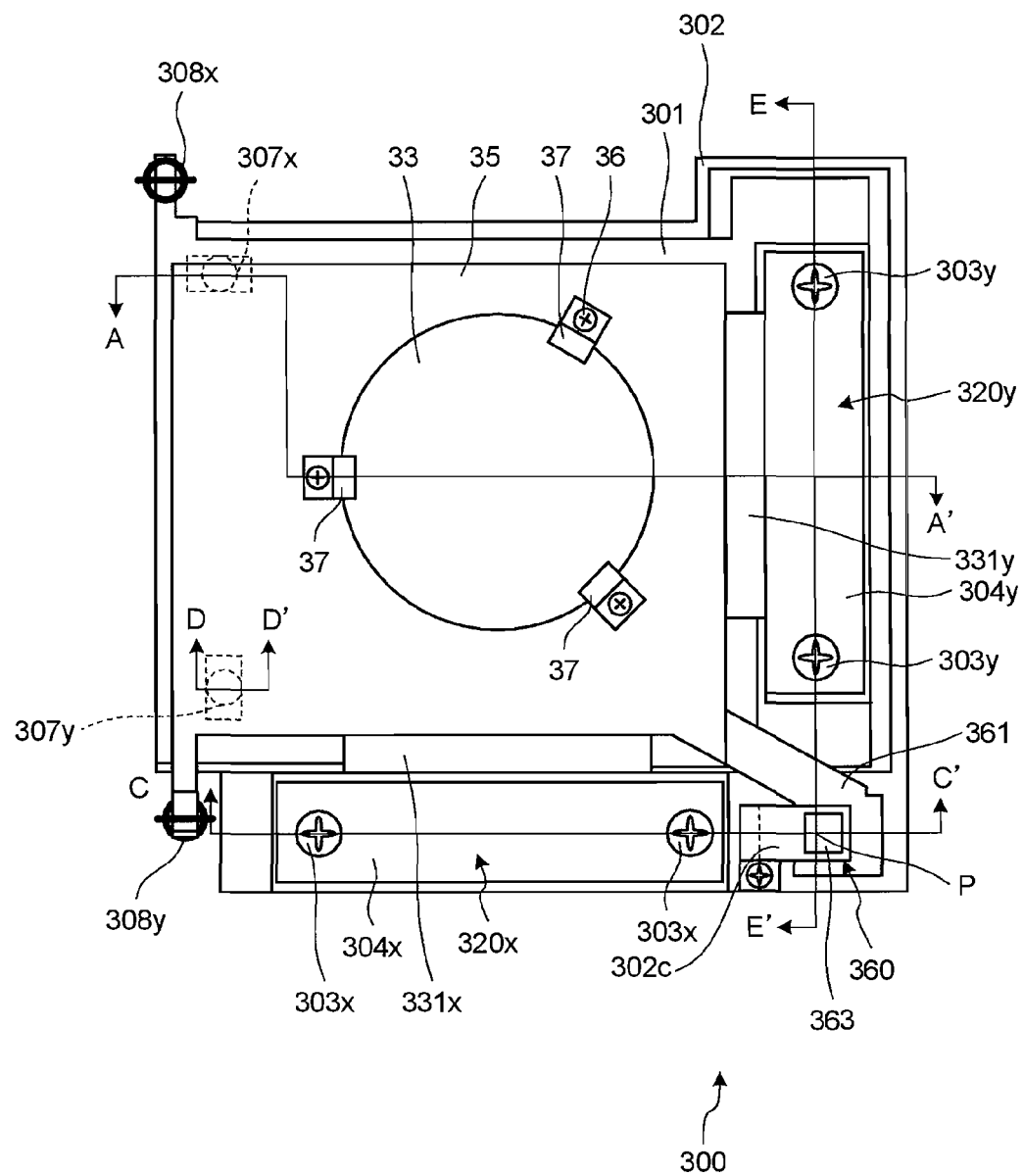
FIG. 4 is a plan view of relevant part of the image stabilizer.

The CCD 31 and the optical LPF 32 are covered in an airtight manner with a holder 35. As shown in FIG. 4, the dust-proof filter 33 as a whole has a plate-like circular (polygonal) shape, and is made of an elastic material such as a plate spring. The dust-proof filter 33 is supported while pressed by pressing members 37 that are fixed to the holder 35 with screws 36.

Described next is the image stabilizer function of the electronic camera according to the embodiment. As used herein, "Z-axis direction" refers to the direction of the imaging optical axis, "X-axis direction" refers to a first-side direction (longitudinal direction) of the rectangle CCD 31 arranged on the imaging optical axis perpendicular thereto, and "Y-axis direction" refers to a second-side direction (short-side direction) of the rectangle CCD 31 perpendicular to the first-side direction. The image stabilizer 300 moves the CCD 31 in either or both the X-axis direction and the Y-axis direction to correct the position on the imaging surface of the CCD 31 where light rays reflected from an object are focused. The image stabilizer 300 uses as a driving source an actuator that generates elliptic vibration in a driving member when applied with a predetermined frequency voltage. The image stabilizer 300 moves the holder 35 having the CCD 31 mounted thereon in the imaging unit 30.

Figure 2A:
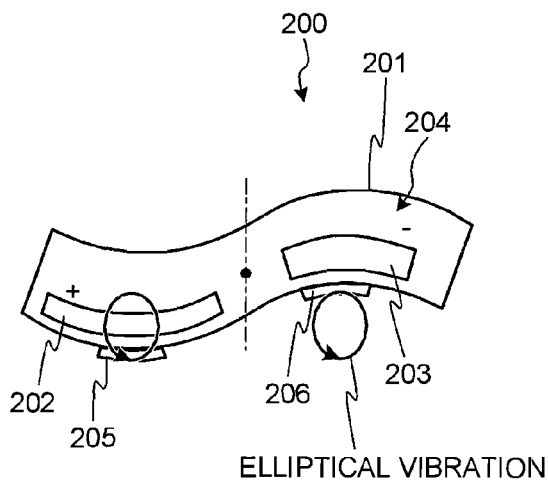
FIG. 2 is a schematic diagram illustrating the operating principle of a vibrator shown in FIG. 1.
Figure 2B:
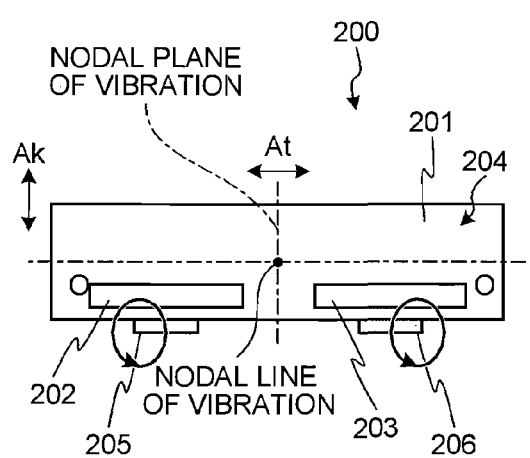
Figure 2C:
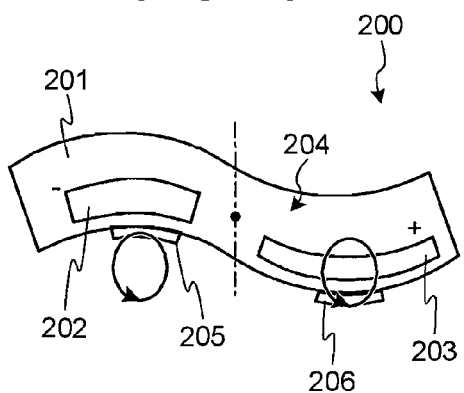

The following is a description with reference to FIG. 2 of the operating principle of a vibrator 200 used as an actuator in the image stabilizer 300. FIG. 2 is a schematic diagram illustrating the operating principle of the vibrator 200. The vibrator 200 includes a piezoelectric body 201, a piezoelectric element 204 formed of a pair of driving electrodes 202 and 203, and two drivers 205 and 206 as driving members. The piezoelectric body 201 has a predetermined size, and has as a whole an elongated, rectangular shape. The driving electrodes 202 and 203 are formed to be symmetrical about the center of the piezoelectric body 201 on one side thereof. The drivers 205 and 206 are arranged along an axis in parallel with the central axis of the piezoelectric element 204 on the surface of the piezoelectric body 201 at positions corresponding to the driving electrodes 202 and 203, respectively. If the vibrator 200 generates only longitudinal vibration so that it expands and contracts in the longitudinal direction, a node of the longitudinal vibration represents a nodal plane. The nodal plane is a plane of zero amplitude, and the amplitude of the vibration is maximum at the edges of the piezoelectric body 201 in the longitudinal direction. On the other hand, if the vibrator 200 generates only bending vibration, a node of the bending vibration represents a nodal line (depth direction in FIG. 2). The nodal line, at which amplitude is zero, is present in the nodal plane, and the piezoelectric body 201 rotationally vibrates about the nodal line. The vibrator 200 generates elliptic vibration in the drivers 205 and 206 by a combination of the longitudinal vibration in a direction At (indicated by arrow At in FIG. 2) and the bending vibration in a direction Ak (indicated by arrow Ak) perpendicular to the direction At.

A sinusoidal wave voltage at a predetermined frequency is applied to one of the driving electrodes of the piezoelectric body 201, i.e., the driving electrode 202. At the same time, a sinusoidal wave voltage at the predetermined frequency with a phase shifted from that of the frequency of the sinusoidal wave voltage applied to the driving electrode 202 is applied to the other of the driving electrodes, i.e., the driving electrode 203. The frequency of the sinusoidal wave voltages to be applied is set to a predetermined value such that the center of the piezoelectric body 201 corresponds to the node of the bending vibration, the drivers 205 and 206 correspond to a loop of the bending vibration, and the nodal plane of the longitudinal vibration of the piezoelectric body 201 matches the node of the bending vibration. As a result, along with changes in the polarity, i.e., plus and minus, of the applied voltage, the vibrator 200 repeats the bending vibration and the longitudinal vibration, i.e., states (a) to (c) shown in FIG. 2 including the state (b). Thus, the vibrator 200 generates elliptic vibration on the surfaces of the drivers 205 and 206. Accordingly, by arranging a movable body to be driven in such a manner that it is in pressure contact with the drivers 205 and 206 side of the vibrator 200, the movable body moves according to the direction of the elliptic vibration on the surfaces of the drivers 205 and 206.

Figure 3:
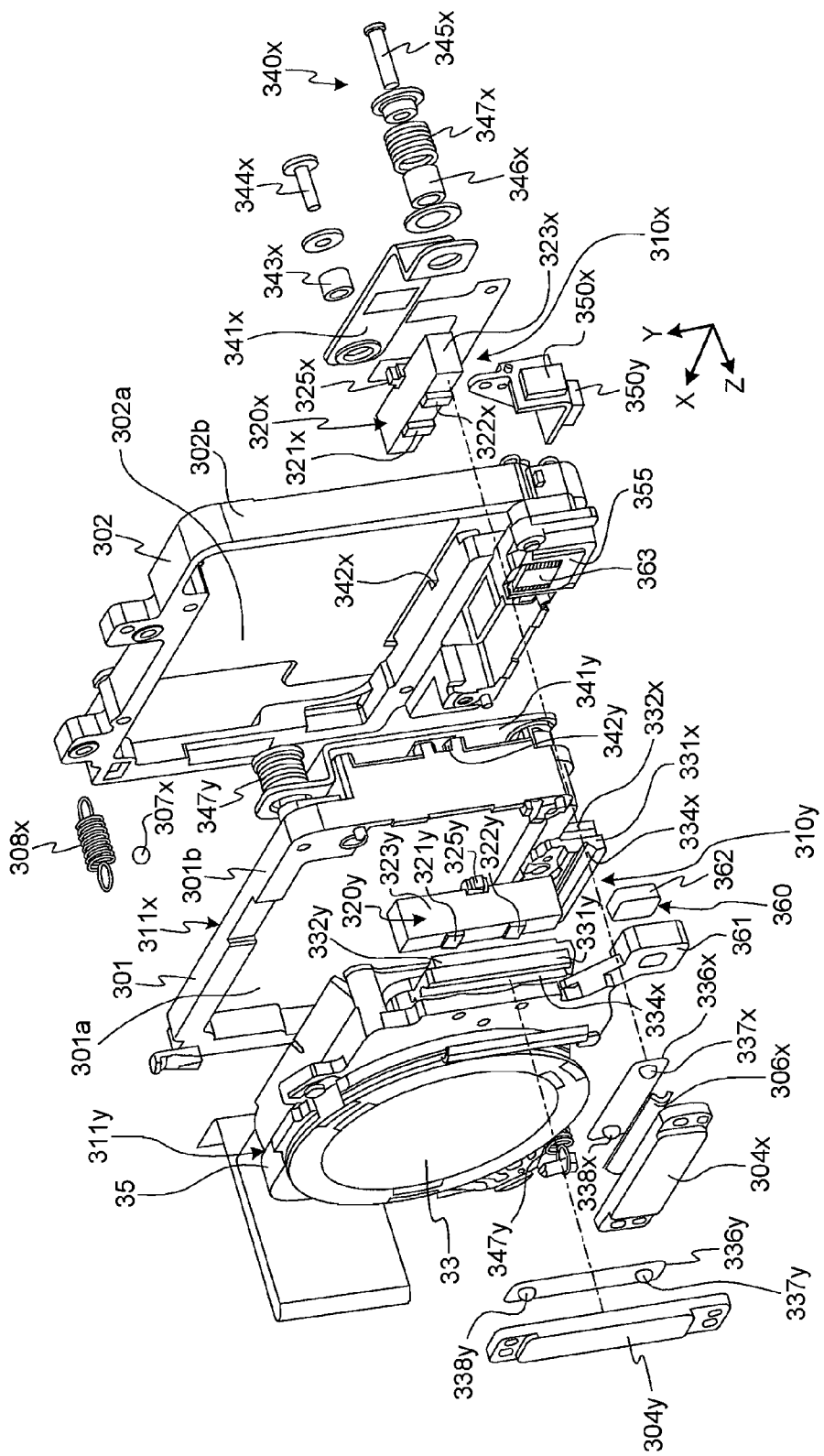
FIG. 3 is an exploded perspective view of the image stabilizer.
Figure 5:
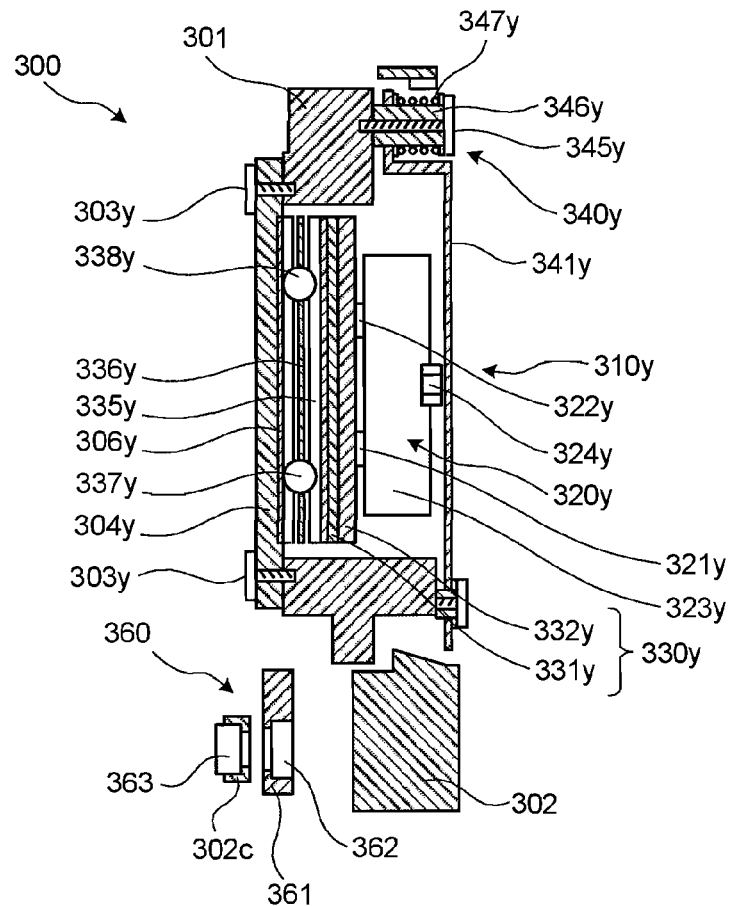
FIG. 5 is a cross section taken along line E-E' of FIG. 4.
Figure 6:
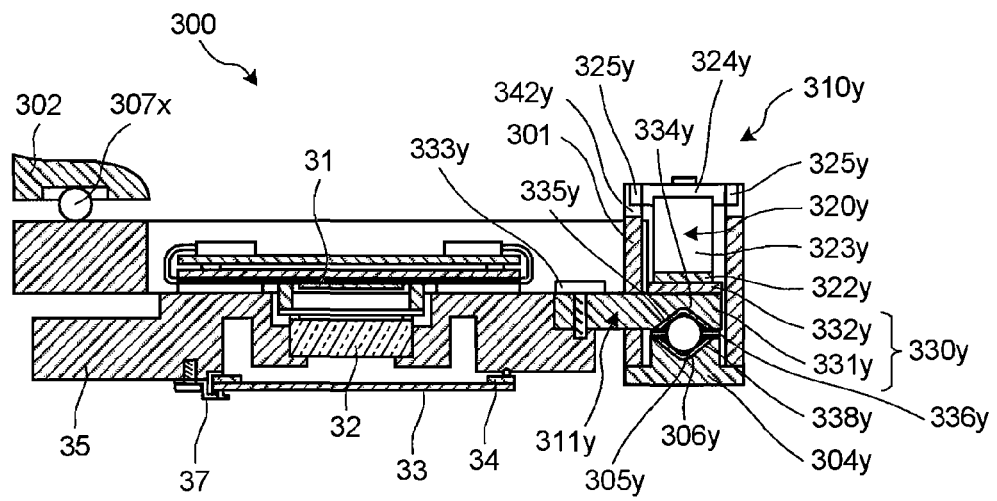
FIG. 6 is a cross section taken along line A-A' of FIG. 4.
Figure 7:
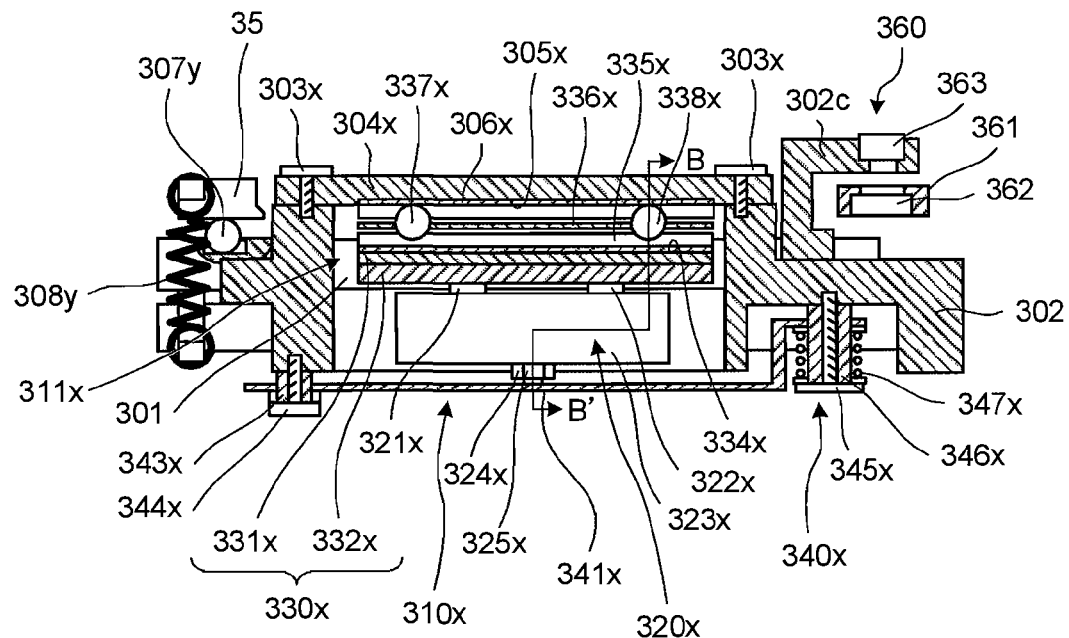
FIG. 7 is a cross section taken along line C-C' of FIG. 4 including a cross section taken along line D-D'.
Figure 8:
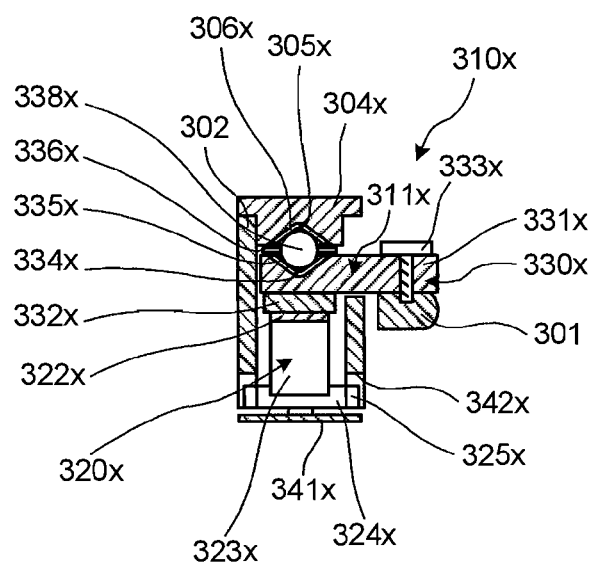
FIG. 8 is a cross section taken along line B-B' of FIG. 7.

With reference to FIGS. 3 to 8, the image stabilizer 300 is described below that uses the vibrator 200 as an actuator. FIG. 3 is an exploded perspective view of the image stabilizer 300. FIG. 4 is a schematic plan view of relevant part of the image stabilizer 300. FIG. 5 is a cross section taken along line E-E' of FIG. 4. FIG. 6 is a cross section taken along line A-A' of FIG. 4. FIG. 7 is a cross section taken along line C-C' of FIG. 4 including a cross section taken along line D-D'. FIG. 8 is a cross section taken along line B-B' of FIG. 7. The image stabilizer 300 shifts, as an object to be moved, the holder 35 (second movable member) having the CCD 31 mounted thereon in either or both the X-axis direction and the Y-axis direction. The image stabilizer 300 includes an X frame 301 and a frame (fixed member) 302. The X frame 301 includes a frame portion 301b that surrounds an opening 301a around the imaging optical axis. The X frame 301 movably supports the holder 35 in the Y-axis direction. The frame 302 includes a frame portion 302b that surrounds an opening 302a around the imaging optical axis. The frame 302 movably supports the X frame 301 in the X-axis direction and is fixed to the camera main body (not shown).

The image stabilizer 300 further includes an X-axis drive mechanism 310x and a Y-axis drive mechanism 310y. The X-axis drive mechanism 310x moves the X frame 301 in the X-axis direction with respect to the frame 302. The Y-axis drive mechanism 310y moves the holder 35 in the Y-axis direction with respect to the X frame 301. With the X-axis drive mechanism 310x and the Y-axis drive mechanism 310y, the image stabilizer 300 shifts the holder 35 together with the X frame 301 in the X-axis direction with respect to the frame 302 as well as shifting the holder 35 in the Y-axis direction with respect to the X frame 301. Thus, The CCD 31 mounted on the holder 35 is shifted in either or both the X-axis direction and the Y-axis direction in the X-Y plane to correct for camera shake.

Described below is the configuration of the X-axis drive mechanism 310x. The X-axis drive mechanism 310x includes an X-axis vibrator (first actuator) 320x, a slide member 330x, and a pressing mechanism 340x. The slide member 330x constitutes a first movable member 311x that is fixed to the X frame 301 and driven with the X frame 301. The pressing mechanism 340x biases the X-axis vibrator 320x to the side of the slide member 330x.

The X-axis vibrator 320x includes a piezoelectric element 323x that has as a whole an elongated, rectangular shape. Following the operating principle of the vibrator 200 previously described in connection with FIG. 2, the X-axis vibrator 320x generates elliptic vibration when applied with a predetermined frequency voltage in drivers (driving members) 321x and 322x which are arranged on one side of the piezoelectric element 323x. The X-axis vibrator 320x further includes a vibrator holder 324x at the center of the side of the piezoelectric element 323x opposite to the side where the drivers 321x and 322x are arranged. The vibrator holder 324x is provided with a protrusion 325x that is configured to fit in a groove (holding portion) 342x of the frame 302. When the protrusion 325x is fitted in the groove 342x, the X-axis vibrator 320x is positioned and held such that its movement is regulated in the X-axis direction. With this configuration, a driving force due to elliptic vibration that occurs in the drivers 321x and 322x acts along the X-axis direction.

The slide member 330x is formed of a bearing (guided member) 331x and a slide plate (sliding portion) 332x that is fixed to the bearing 331x. The bearing 331x is fixed to a portion of the X frame 301 with, for example, a screw 333x at a position where the drivers 321x and 322x on the piezoelectric element 323x are pressed into contact with the slide plate 332x. Thus, the bearing 331x is integrated with the X frame 301. The slide member 330x is smaller than the X frame 301. Specifically, the slide member 330x is equivalent in size to the X-axis vibrator 320x. The X frame 301 is made of a material such as low hardness resin or aluminum. On the other hand, the slide plate 332x is made of a material such as high hardness ceramic having wear resistance. The bearing 331x is made of a quenchable material such as ferrite stainless and is quenched to increase the hardness.

The frame 302 includes an attachment portion in a form of opening and a bearing (guiding member) 304x. The bearing 304x is fixed to the attachment portion with a screw 303x to face the bearing 331x of the slide member 330x. As shown in FIG. 8, on the bearing 304x is formed a V-shaped groove 305x along the X-axis direction by fixing thereto a V-shaped groove plate 306x for wear protection. Besides, on the bearing 331x is formed a V-shaped groove 334x by fixing thereto a V-shaped groove plate 335x for wear protection to be opposed to the V-shaped groove 305x (the V-shaped groove plate 306x). Between the bearing 304x and the bearing 331x, two balls (rotating members) 337x and 338x positioned by a retainer 336x are arranged along the X-axis direction. The balls 337x and 338x are fitted in between the V-shaped groove 305x and the V-shaped groove 334x. As shown in FIG. 7, the balls 337x and 338x are positioned separate from the drivers 321x and 322x to the outside. The retainer 336x regulates the movement of the balls 337x and 338x in the X-axis direction. The rotating members need not necessarily be balls, and can be rollers.

The pressing mechanism 340x includes a pressing plate 341x and a pressing spring 347x. One edge of the pressing plate 341x is fixed via a spacer 343x to the frame 302 with a screw 344x to support the X-axis vibrator 320x. The other edge of the pressing plate 341x is fixed to the frame 302 with a screw 345x. The pressing spring 347x is arranged around the screw 345x with a spacer 346x therebetween, and biases the pressing plate 341x so that the drivers 321x and 322x of the X-axis vibrator 320x are brought into pressure contact with the slide plate 332x. The pressure exerted by the pressing mechanism 340x is set to a high value of around 15 N (Newton).

The bearing 331x is rotatable around an axis passing through the center of the balls 337x and 338x and in parallel with the V-shaped groove 334x, and is integrated with the X frame 301. Between the X frame 301 and the frame 302 is arranged a ball (rotating member) 307x in a position separate from the bearing 331x in a direction other than the X-axis direction. The ball 307x is held by a biasing force of a spring 308x engaged between the X frame 301 and the frame 302, and is positioned to maintain a spacing in the imaging optical axis direction (the Z-axis direction) that the X frame 301 has with respect to the frame 302. The biasing force of the spring 308x is sufficient if capable of maintaining the ball 307x to be held, and is set to be smaller than that of the pressing spring 347x. With this configuration, the first movable member 311x formed of the X frame 301 and the slide member 330x is movable with respect to the frame 302 based on three-point support by the balls 337x, 338x, and 307x. Besides, the ball 307x is arranged opposite to the balls 337x and 338x with the imaging optical axis and the opening 301a therebetween. Accordingly, the ball 307x can be spaced apart from the balls 337x and 338x, which provides a stable three-point support structure. As described above, according to the embodiment, three balls (rotating members) guides the moving direction of the first movable member 311x as well as regulating the inclination thereof. Thus, stable driving operation can be achieved.

The Y-axis drive mechanism 310y including a Y-axis vibrator (second actuator) 320y is of basically the same configuration as the X-axis drive mechanism 310x. Therefore, parts corresponding to those mentioned previously are identified by like reference numerals but with the addition of the suffix "y", and like description is not repeated. Incidentally, the Y-axis drive mechanism 310y includes a slide member 330y that constitutes a second movable member 311y. The second movable member 311y is integrally fixed to the holder 35, and is driven together with the holder 35.

The image stabilizer 300 further includes an X-axis gyroscope 350x and a Y-axis gyroscope 350y on the frame 302. The X-axis gyroscope 350x detects camera shake around the X axis of the body unit 100 (in the pitch direction), while the Y-axis gyroscope 350y detects camera shake around the Y axis thereof (in the yaw direction) The image stabilizer 300 still further includes a position sensor 360, a vibrator drive circuit 354, and a vibration control circuit 355. The position sensor 360 detects a position of the CCD 31. According to an instruction from the Bucom 50, the vibration control circuit 355 controls the vibrator drive circuit 354 for the X-axis vibrator 320x and the Y-axis vibrator 320y based on a signal from the X-axis gyroscope 350x, the Y-axis gyroscope 350y, and the position sensor 360.

The operation of the X-axis drive mechanism 310x is described below. As described above, the X-axis vibrator 320x generates elliptic vibration in the drivers 321x and 322x when applied with a predetermined frequency voltage. As a result, since the drivers 321x and 322x are in pressure contact with the slide plate 332x by a strong biasing force of the pressing mechanism 340x, the slide member 330x is driven in the direction of the elliptic vibration of the drivers 321x and 322x.

Although the X-axis vibrator 320x is applied with high pressure, the drivers 321x and 322x are stably in pressure contact with the slide plate 332x because of the high hardness of the slide plate 332x and the bearing 331x. Accordingly, the driving force caused by the elliptic vibration is reliably transmitted to the slide plate 332x, and thus the slide member 330x can be efficiently driven in the direction of the elliptic vibration. Besides, the slide member 330x having the slide plate 332x is not in surface contact with the frame 302, but is in contact therewith via the rotating balls 337x and 338x at the bearings 331x and 304x. Therefore, even with high pressure, the slide member 330x reliably moves with low friction with respect to the frame 302. The bearings 331x and 304x have a ball bearing structure including balls placed in a row along the X-axis direction. Thus, when driven by the X-axis vibrator 320x, the slide member 330x moves only in the X-axis direction. With this, the X frame 301 having the slide member 330x fixed thereto also moves in the X-axis direction together with the slide member 330x. In other words, the moving direction of the X frame 301 is also guided by the engagement between the bearings 331x and 304x having a ball bearing structure in which balls are placed in a row along the X-axis direction.

In such a configuration, the bearing 331x is rotatable around an axis passing through the center of the balls 337x and 338x and in parallel with the V-shaped groove 334x. As described above, according to the embodiment, the bearing 331x is integrated with the X frame 301. Between the X frame 301 and the frame 302 is arranged the ball 307x in a position separate from the bearing 331x in a direction other than the X-axis direction. The first movable member 311x formed of the X frame 301 and the slide member 330x is supported with respect to the frame 302 based on three-point support by the balls 337x and 338x, and the ball 307x located separate from the balls 337x and 338x. As a result, the first movable member 311x stably moves on the frame 302 along the X-axis direction without being affected by the rotation around the axis in parallel with the V-shaped groove 334x. Therefore, a guide support mechanism for a portion where the X-axis vibrator 320x is applied with high pressure is only required to have the ball bearing structure of the bearings 331x and 304x that includes balls placed in a row along the X-axis direction. Thus, it is possible to downsize the electronic camera as well as to simplify the configuration of the camera.

It should be noted that the Y-axis drive mechanism 310y operates basically in the same manner as the X-axis drive mechanism 310x.

Figure 9:
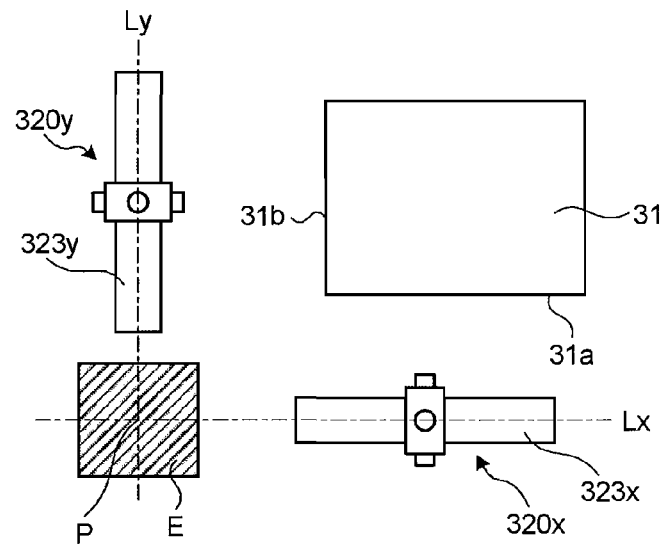
FIG. 9 is a rear view of a charge-coupled device (CCD) shown in FIG. 1.
Figure 10:
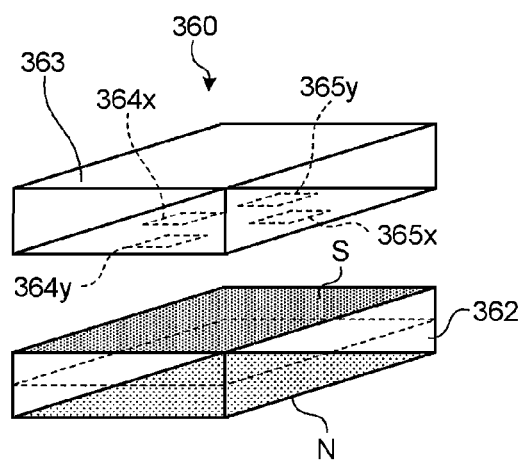
FIG. 10 is an enlarged perspective view of a position sensor and a magnet shown in FIG. 3.
Figure 11:
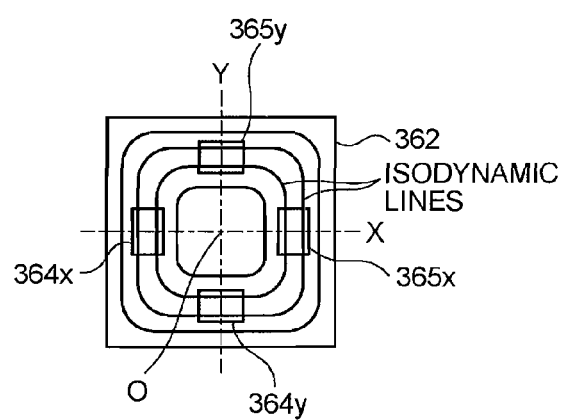
FIG. 11 is a front view for explaining a positional relation between the distribution of magnetic field lines of the magnet and arrangement of hall elements.
Figure 12:
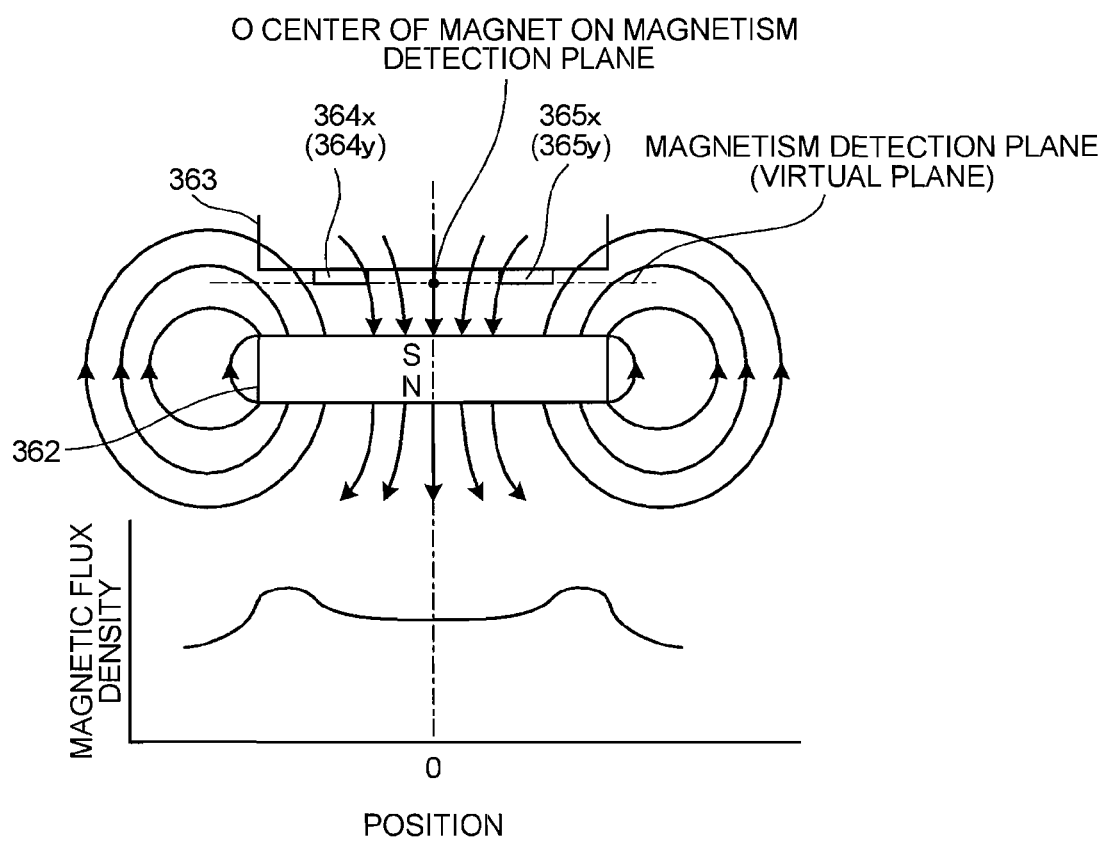
FIG. 12 is plan view for explaining a positional relation between the distribution of magnetic field lines of the magnet and arrangement of hall elements.

The following is a description with reference to FIGS. 4, 5, and 9 to 12 of the arrangement of the X-axis vibrator 320x, the Y-axis vibrator 320y and the position sensor 360, and a configuration of the position sensor 360. FIG. 9 is a schematic diagram showing a positional relation between the X-axis vibrator 320x and the Y-axis vibrator 320y viewed from the rear side of the CCD 31. FIG. 10 is an enlarged perspective view of the position sensor 360 and a magnet. FIG. 11 is a front view for explaining a positional relation between the distribution of magnetic field lines of the magnet and arrangement of hall elements. FIG. 12 is plan view for explaining a positional relation between the distribution of the magnetic field lines of the magnet and arrangement of the hall elements.

On the frame 302, the X-axis vibrator 320x including the piezoelectric element 323x that has as a whole an elongated, rectangular shape is arranged near a first side (long side) 31a of the CCD 31 in parallel with the direction of the first side 31a (the X-axis direction). On the other hand, on the X frame 301, the Y-axis vibrator 320y including the piezoelectric element 323y that has as a whole an elongated, rectangular shape is arranged near a second side (short side) 31b of the CCD 31, which is perpendicular to the first side 31a, in parallel with the direction of the second side 31b (the Y-axis direction) The CCD 31 is formed in horizontally a little long rectangle with a ratio of the sides, for example, 4:3. The X-axis vibrator 320x is located at a position near intersection P of a longitudinal axis Lx of the X-axis vibrator 320x and a longitudinal axis Ly of the Y-axis vibrator 320y not to interfere with the Y-axis vibrator 320y. Similarly, the Y-axis vibrator 320y is located at a position near the intersection P not to interfere with the X-axis vibrator 320x.

The position sensor 360 detects the relative position of the CCD 31 shifted by the X-axis vibrator 320x and the Y-axis vibrator 320y. As shown in FIG. 9, the position sensor 360 is located in a region E partly surrounded by an edge of the X-axis vibrator 320x and the Y-axis vibrator 320y and including the intersection P. As shown in FIGS. 4 and 5, the position sensor 360 includes an arm 361, a magnet 362, and a detecting unit 363. The arm 361 extends from a portion of the holder 35 having the CCD 31 mounted thereon to the region E. The magnet 362 is attached to an end of the arm 361. The detecting unit 363 is supported by a supporting member 302c with respect to the frame 302, and faces the magnet 362 in the imaging optical axis direction in the region E.

The detecting unit 363 includes a plurality of hall elements to detect a change in the magnetic force (magnetic flux density) of the magnet 362 in the region E. Specifically, according to the embodiment, the detecting unit 363 includes four hall elements 364x, 365x, 364y, and 365y. As shown in FIGS. 10 and 11, the hall elements 364x and 365x are located on an X axis, while the hall elements 364y and 365y are located on a Y axis. The X and Y axes correspond to the directions of the first side 31a and the second side 31b of the CCD 31, respectively.

As also shown in FIGS. 10 and 11, the magnet 362 is rectangular, and has a magnetic pole on each end (pole face) in the imaging optical axis direction (the z-axis direction), one called the north (N) pole and the other called the south (S) pole. As shown in FIG. 12, magnetic field lines are symmetrically distributed around the magnet 362 such that they extend from the N pole to the S pole, and the magnetic field is maximum near the edges of the magnet 362. Thus, in the S pole face that faces the detecting unit 363, the magnet 362 exhibits isodynamic lines (distribution of equal magnetic flux density) pattern in substantially rectangular loops. Incidentally, the magnet 362 can be circular. In this case, the magnet 362 exhibits an isodynamic line pattern in concentric circles.

The distribution of magnetic field lines is such that, when the X frame 301 and the holder 35 are located at substantially the center of the movement range, i.e., when the CCD 31 is located at a reference position where a travel distance thereof is 0 (zero), the center of the magnetic field lines matches the center O of the X axis and the Y axis. The hall elements 364x and 365x are arranged spaced apart from each other on the X axis, while the hall elements 364y and 365y are arranged spaced apart from each other on the Y axis. In a magnetism detection plane, as shown in FIG. 12, the hall elements 364x and 365x are each arranged correspondingly to a magnetic flux density curving point inside a magnetic flux density maximum point, and symmetrically with respect to the center O. Similarly, the hall elements 364y and 365y are each arranged correspondingly to a magnetic flux density curving point inside a magnetic flux density maximum point, and symmetrically with respect to the center O.

In this configuration, when the X-axis gyroscope 350x and the Y-axis gyroscope 350y detect camera shake, either or both the X-axis vibrator 320x and the Y-axis vibrator 320y are driven by the vibrator drive circuit 354. Thus, the holder 35 having the CCD 31 mounted thereon is moved in either or both the X-axis direction and the Y-axis direction. On this occasion, the position sensor 360 detects whether the CCD 31 is shifted from the reference position to a desired position to compensate for the camera shake. The detection result is used for feedback control of the X-axis vibrator 320x and the Y-axis vibrator 320y.

For example, if the X-axis vibrator 320x is driven and the holder 35 having the CCD 31 mounted thereon shifts in the X-axis direction, the arm 361 shifts the magnet 362 integrated with the holder 35 in the X-axis direction together with the holder 35. The hall elements 364x and 365x detects the same magnetic intensity when the CCD 31 is at the reference position. However, along with the movement of the holder 35 (the magnet 362), the magnetic intensity detected by the hall element 364x differs from that detected by the hall element 365x, one increases while the other decreases. For this reason, a difference between the magnetic intensities detected by the hall elements 364x and 365x on the X axis is calculated as a damping ratio, and arithmetic processing is performed using a predetermined arithmetic expression. Thus, it is possible to accurately detect the angle of the CCD 31 and travel distance (relative position) thereof from the reference position in the X-axis direction. Based on the detection result, the feedback control of the X-axis vibrator 320x is performed in such a manner as to stop the movement of the CCD 31 when the relative position of the CCD 31 detected by the position sensor 360 reaches a desired position. Also in the case where the Y-axis vibrator 320y is driven and the holder 35 (the magnet 362) moves in the Y-axis direction, it is possible to accurately detect the angle of the CCD 31 and travel distance (relative position) thereof from the reference position in the Y-axis direction. Based on the detection result, the feedback control of the Y-axis vibrator 320y is performed in such a manner as to stop the movement of the CCD 31 when the relative position of the CCD 31 detected by the position sensor 360 reaches a desired position.

In the image stabilizer 300 of the embodiment configured as above, the X-axis vibrator 320x and the Y-axis vibrator 320y are located at a position near the intersection P of the longitudinal axes Lx and Ly of them not to interfere with each other. The position sensor 360 detects the relative position of the CCD 31, and is located in the region E partly surrounded by an edge of the X-axis vibrator 320x and the Y-axis vibrator 320y and including the intersection P. Thus, the position sensor 360 can be arranged in a small dead space between the X-axis vibrator 320x and the Y-axis vibrator 320y. This achieves downsizing of the image stabilizer 300. Although the size of the region E in the dead space is limited, the position sensor 360 can be arranged in the region E with no problem because the detecting unit 363 is formed integrally with the hall elements that detect magnetic fields in two directions, i.e., the X-axis and Y-axis directions, to be compact. Besides, the position sensor 360 can be arranged as close as possible to the CCD 31, which reduces errors superimposed in the detection system and thereby enables accurate detection of the relative position of the CCD 31. The position sensor 360 can also be arranged as close as possible to the X-axis vibrator 320x and the Y-axis vibrator 320y that control the position of the CCD 31. Therefore, the movement of the CCD 31 moved through the X-axis vibrator 320x and the Y-axis vibrator 320y can be directly controlled. Thus, feedback control of the X-axis vibrator 320x and the Y-axis vibrator 320y can be appropriately performed.

The following is examples of modifications of the embodiment. For example, in the embodiment described above, a couple of hall elements are provided on each of the X axis and the Y axis, and a difference between their detection results is calculated as a damping ratio. Based on the damping ratio, the relative position of the CCD 31 is detected. However, hall elements can be provided on the X and Y axes, one on each of them. In this case, the relative position of the CCD 31 is detected based on changes in magnetic intensity detected by the hall elements. In addition, while the hall elements are illustrated as being arranged on the S-pole side of the magnet, they can be arranged on the N-pole side, or both the S-pole and N-pole sides. When the hall elements are arranged on both the S-pole and N-pole sides, the size of the region E shown in FIG. 9 can be reduced.

Figure 13:
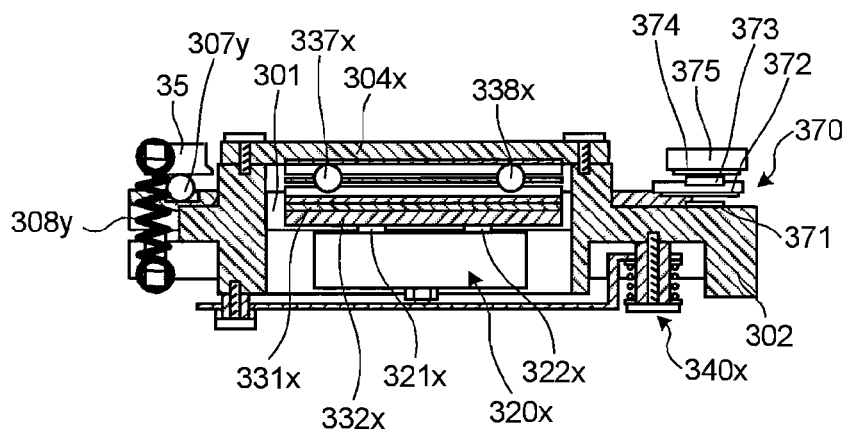
FIG. 13 is a cross section taken along line C-C' of FIG. 4 according to a modification of the embodiment.
Figure 14:
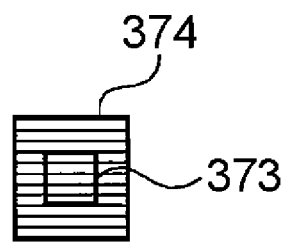
FIG. 14 is a front view for explaining a positional relation between a Y-axis sensor and a Y-axis scale shown in FIG. 13.
Figure 15:
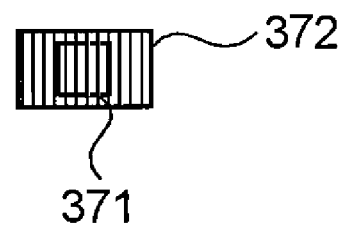
FIG. 15 is a front view for explaining a positional relation between an X-axis sensor and an X-axis scale shown in FIG. 13.

The sensing system of the position sensor is not restricted to the magnetic sensing system using a magnet and hall elements, but can be, for example, an optical sensing system. FIGS. 13 to 15 depict a position sensor 370 employing an optical sensing system according to a modification of the embodiment. FIG. 13 is a cross section of relevant part of the image stabilizer taken along line C-C' of FIG. 4 corresponding to that of FIG. 7. FIG. 14 is a front view for explaining a positional relation between a Y-axis sensor and a Y-axis scale. FIG. 15 is a front view for explaining a positional relation between an X-axis sensor and an X-axis scale.

The position sensor 370 includes an X-axis sensor 371, an X-axis scale 372, a Y-axis sensor 373, and a Y-axis scale 374. The X-axis sensor 371 is arranged on the frame 302. The X-axis scale 372 is arranged on the X frame 301, and its travel distance is detected by the X-axis sensor 371. The Y-axis sensor 373 is arranged on the X frame 301. The Y-axis scale 374 is arranged on a supporting member 375 of the holder 35 having the CCD 31 mounted thereon, and its travel distance is detected by the Y-axis sensor 373. The X-axis sensor 371 and the Y-axis sensor 373 are each formed of a reflective optical sensor. On the X-axis scale 372 and the Y-axis scale 374, white and black tone patterns are formed at regular intervals with a predetermined pitch in the X-axis direction and the Y-axis direction, respectively. The X-axis sensor 371 and the Y-axis sensor 373 detect the number of the tone patterns from the reference position, based on which the position sensor 370 detects relative movement of the CCD 31 in the X-axis direction and the Y-axis direction. The X-axis sensor 371, the X-axis scale 372, the Y-axis sensor 373, and the Y-axis scale 374 are closely arranged in this order along the Z-axis direction in parallel with the imaging optical axis direction in the region E including the intersection P of the longitudinal axes Lx and Ly of the X-axis vibrator 320x and the Y-axis vibrator 320y. As shown in FIG. 15, the X-axis scale 372 is formed in a size capable of covering its movement range with respect to the X-axis sensor 371. On the other hand, as shown in FIG. 14, the Y-axis scale 374 is formed in a size capable of covering its movement range with respect to the X-axis sensor 371 as well as the Y-axis sensor 373.

As described above, according to the modification of the embodiment, although the position sensor 370 includes separate sensors for both the X-axis direction and the Y-axis direction, they are closely arranged in layers along the imaging optical axis direction in the region E. Therefore, the position sensor 370 can be arranged in the region E with no problem. In particular, the X-axis sensor 371 and the X-axis scale 372 are arranged close to each other, and also the Y-axis sensor 373 and the Y-axis scale 374 are arranged close to each other. This arrangement can improve the detection accuracy. Moreover, since the Y-axis scale 374 is formed in a size capable of covering its movement range with respect to not only the Y-axis sensor 373 but also the X-axis sensor 371, reliable detection can be ensured.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image stabilizer for correcting a position on a surface of a rectangular imaging device where light rays reflected from an object are focused, the image stabilizer comprising: a fixed member that includes a first actuator including a piezoelectric element having as a whole an elongated shape, the fixed member being arranged near a first side of the imaging device in parallel with a direction of the first side; a first movable member that includes a second actuator including a piezoelectric element having as a whole an elongated shape, the first movable member being arranged near a second side of the imaging device perpendicular to the first side in parallel with a direction of the second side, the first movable member moving, when driven by the first actuator, in the direction of the first side on the fixed member; a second movable member that is mounted with the imaging device and moves, when driven by the second actuator, in the direction of the second side on the first movable member; and a position sensor that detects a relative position of the imaging device moved by at least one of the first actuator and the second actuator, wherein the first actuator is located near a virtual intersection of a longitudinal axis of the first actuator and a longitudinal axis of the second actuator not to interfere with the second actuator, the second actuator is located near the virtual intersection not to interfere with the first actuator, and the position sensor is located in a region that is partly surrounded by an edge of the first actuator and the second actuator and that includes the virtual intersection, wherein at least one of a plurality of hall elements is located on each of an X axis corresponding to the direction of the first side and a Y axis corresponding to the direction of the second side, and a magnet has a magnetic pole on each face in an optical axis direction, and when each of the first movable member and the second movable member is located at a reference position where a travel distance of the movable member is zero, a center of magnetic field lines of the magnet substantially matches a center of the X axis and the Y axis, and the center of the magnetic field lines of the magnet is a magnetic flux density maximum point.

2. The image stabilizer according to claim 1, wherein the position sensor includes an arm that extends from the second movable member to the region; the magnet attached to an end of the arm; and a detecting unit that includes the plurality of hall elements to detect a change in magnetic force of the magnet in the region.

3. The image stabilizer according to claim 2, wherein, in a pole face that faces the detecting unit, the magnet exhibits an isodynamic line pattern in a closed-loop form.

4. The image stabilizer according to claim 1, wherein the hall elements are arranged along any one of the X axis and the Y axis.

5. The image stabilizer according to claim 4, wherein, in a magnetism detection plane, each of the hall elements is arranged correspondingly to a magnetic flux density curving point inside a magnetic flux density maximum point, and symmetrically with respect to a center of the magnet.

6. An image stabilizer for correcting a position on a surface of a rectangular imaging device where light rays reflected from an object are focused, the image stabilizer comprising:
   a fixed member that includes a first actuator including a piezoelectric element having as a whole an elongated shape, the fixed member being arranged near a first side of the imaging device in parallel with a direction of the first side;
   a first movable member that includes a second actuator including a piezoelectric element having as a whole an elongated shape, the first movable member being arranged near a second side of the imaging device perpendicular to the first side in parallel with a direction of the second side, the first moveable member moving, when driven by the first actuator, in the direction of the first side on the fixed member;
   a second movable member that is mounted with the imaging device and moves, when driven by the second actuator, in the direction of the second side on the first moveable member; and
   a position sensor that detects a relative position of the imaging device moved by at least one of the first actuator and the second actuator, wherein
   the first actuator is located near a virtual intersection of a longitudinal axis of the first actuator and a longitudinal axis of the second actuator not to interfere with the second actuator,
   the second actuator is located near the virtual intersection not to interfere with the first actuator, and
   the position sensor is located in a region that is partly surrounded by an edge of the first actuator and the second actuator and that includes the virtual intersection, wherein
   the position sensor includes:
   an X-axis sensor that is arranged on the fixed member;
   an X-axis scale that is arranged on the first movable member, a travel distance of the X-axis scale being detected by the X-axis sensor;
   a Y-axis sensor that is arranged on the first movable member; and
   a Y-axis scale that is arranged on the second movable member, a travel distance of the Y-axis scale being detected by the Y-axis sensor, and
   the X-axis sensor, the X-axis scale, the Y-axis sensor, and the Y-axis scale are sequentially arranged along a Z-axis direction in parallel with an optical axis direction in the region including the virtual intersection.

7. The image stabilizer according to claim 6, wherein the X-axis sensor and the Y-axis sensor are each formed of a reflective optical sensor, and on each of the X-axis scale and the Y-axis scale, white and black tone patterns are formed at regular intervals with a predetermined pitch.

8. The image stabilizer according to claim 6, wherein the Y-axis scale is formed in a size covering a movement range of the Y-axis scale with respect to the X-axis sensor and the Y-axis sensor.

* * * * *